Patented July 3, 1951

2,559,546

UNITED STATES PATENT OFFICE 2,559,546

3-PYRIDOXY-ALKANOIC ACID COMPOUNDS

Ralph P. Perkins, Midland, Mich., assignor to The Dow Chemical Company, Midland, Mich., a corporation of Delaware No Drawing. Application April 13, 1948, Serial No. 20,827

4 Claims. (Cl. 260—295.5)

1

This invention is concerned with 3-pyridoxy-alkanoic acids and is particularly directed to compounds of the formula:

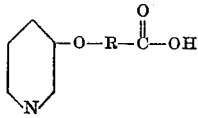

wherein R represents a saturated aliphatic hydrocarbon residue containing from 1 to 5 carbon atoms, inclusive. Compounds of this formula have been found to be white crystalline solids, somewhat soluble in water and many organic solvents, stable at room temperature, and decomposing at melting temperatures. The compounds are useful as intermediates in the preparation of more complex organic derivatives, and have a measure of bactericidal effectiveness.

One method of preparing the 3-pyridoxy-alkanoic acids includes reacting an alkali metal salt of 3-pyridol with an alkali metal salt of a halo-alkanoic acid, and thereafter separating the desired compounds from the mixed products of reaction.

In this preparation, good yields have been obtained by mixing together substantially equi-molecular proportions of the sodium salts of 3-pyridol and a halo-alkanoic acid in the presence of water as a reaction solvent. This is conveniently accomplished by separately dissolving the theoretical amounts of 3-pyridol and acid in aqueous sodium hydroxide, and thereafter mixing together the aqueous salt solutions. An alternative procedure is to dissolve a molar amount of 3-pyridol in an aqueous solution of 2 moles of sodium hydroxide and thereafter to react this solution with the theoretical amount of the halo-alkanoic acid. Molecular excesses of either reactant may be employed, but such practice somewhat complicates the separation and purification of the crude reaction product.

The reaction may be carried out at any temperature up to about 100° C. Temperatures of from about 60° to 100° C. have been found to give good results. A certain amount of heat of reaction results from the mixing of the reactants, and agitation and cooling are recommended in order to avoid local overheating. The addition of the reactants portionwise is also helpful in this regard. The reaction is generally completed in about one hour at the indicated temperatures, although somewhat longer periods are sometimes required.

The separation of the 3-pyridoxy-alkanoic acid from the crude reaction mixture may be accomplished in several ways. One satisfactory procedure includes the addition of a large excess of concentrated aqueous hydrochloric acid to the reaction mixture to precipitate out 3-pyridoxy-alkanoic acid hydrochloride monohydrate, separating the hydrochloride monohydrate by decantation or filtration, and thereafter reacting the hydrochloride with an equi-molecular proportion of aqueous alkali. The resulting aqueous dispersion is then warmed to evaporate off a portion of the water and cooled. The 3-pyridoxy-alkanoic acid precipitates from solution and is recoverd by filtration.

An alternate and preferred mode of operation includes adjusting the crude reaction mixture to a pH of about 3.3 with aqueous hydrochloric acid, allowing the mixture to stand at about 0° C. for from 1 to 4 days and then recovering the 3-pyridoxy-alkanoic acid by filtration. Regardless of the exact manner of separation, the crude 3-pyridoxy-alkanoic acid may be further purified by recrystallization from water, methanol, or alcohol-methanol mixtures as desired.

The following examples illustrate the invention but are not to be construed as limiting.

Example 1

10 grams (0.24 mole) of sodium hydroxide was dissolved in 50 milliliters of water. 9.5 grams (0.1 mole) of 3-pyridol was added portionwise and with stirring to the aqueous sodium hydroxide, and the resulting solution cooled to about 40° C. Ten grams (0.12 mole) of chloroacetic acid was then added with stirring, whereupon the temperature of the mixture gradually increased to 48° C. over a period of 10 minutes. The reaction mixture was heated on a steam bath at 88° C. for one hour, and thereafter allowed to stand at room temperature for two days. The mixture was then diluted with an excess of concentrated aqueous hydrochloric acid and cooled to 1° C. whereupon 3-pyridoxy-acetic acid hydrochloride monohydrate precipitated from solution. This crude product was recovered by filtration and recrystallized from water to obtain 15.2 grams of substantially pure 3-pyridoxy-acetic acid hydrochloride monohydrate as a white crystalline product decomposing without melting at 118° C. and melting with decomposition at 180°–185° C.

10.5 grams (0.05 mole) of the 3-pyridoxy-acetic acid hydrochloride monohydrate was dissolved in 50 milliliters of 1.0 normal aqueous sodium hydroxide. The resulting solution was evaporated to 20 milliliters, cooled to 0° C., and filtered cold to recover precipitated rhombic prisms of 3-pyridoxy-acetic acid. The residue from the filtration was successively washed with cold water and methanol, and dried to recover 5.1 grams of 3-pyridoxy-acetic acid melting at 170° C. with decomposition. Titration of this compound indicated a molecular weight of 154.2 as compared to a theoretical molecular weight of 153.12.

*Example 2*

40 grams (1.0 mole) of sodium hydroxide in 93 grams of water was added portionwise with stirring and cooling at −3° to 5° C. over a period of 47 minutes to 108.5 grams (1 mole) of alpha-chloropropionic acid. The resulting solution was added portionwise with stirring over a period of about 5 minutes to 95.1 grams (1 mole) of 3-pyridol dissolved in 133.5 grams of a 30 percent by weight aqueous sodium hydroxide solution. The reaction mixture was maintained at 100° C. during the addition of the sodium chloropropionate solution and for 1.5 hours thereafter. The mixture was then acidified with 79 milliliters of 36 percent by weight aqueous hydrochloric acid, cooled, and allowed to stand at 0° C. for 3 days. A crude reaction product precipitated from solution, was recovered by filtration, and washed 3 times with 25 milliliter portions of cold water. The product was then recrystallized from a 2 to 1 mixture of methanol and water and dried at 60° C. to obtain alpha-(3-pyridoxy)-propionic acid as a white crystalline product melting at 157° C. with decomposition. The molecular weight of this product was determined by titration to be 167.6 as compared to 167.16, calculated.

*Example 3*

In a similar manner, one mole quantities of sodium alpha-chlorobutyrate and 3-pyridol sodium salt were mixed together in water at 100° C. The reaction mixture was heated at 99°–106° C. for 1.2 hours, acidified with 83 milliliters of 36 percent aqueous hydrochloric acid, maintained at 2° C. for 4 days, and thereafter filtered. This crude product obtained as a residue from the filtration was washed with cold water to remove sodium chloride, and recrystallized several times from aqueous methanol to obtain alpha-(3-pyridoxy)-butyric acid as a white crystalline solid melting at 151° C. with decomposition. The molecular weight of this product was determined by titration as being 181.8. Calculated molecular weight for the compound is 181.19.

Other halo-alkanoic acids may be substituted for those shown in the examples to obtain similar and related compounds. Thus beta-(3-pyridoxy)-propionic acid may be prepared from beta-chloropropionic acid, alpha-(3-pyridoxy)-valeric acid from alpha-chlorovaleric acid, alpha-(3-pyridoxy)-caproic acid from alpha-bromocaproic acid, etc.

I claim:

1. A 3-pyridoxy-alkanoic acid having the formula

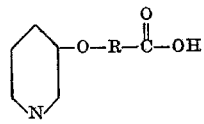

wherein R represents a saturated aliphatic hydrocarbon residue containing from 1 to 5 carbon atoms, inclusive.

2. 3-pyridoxy-acetic acid.
3. Alpha-(3-pyridoxy)-propionic acid.
4. Alpha-(3-pyridoxy)-butyric acid.

RALPH P. PERKINS.

REFERENCES CITED

The following references are of record in the file of this patent:

UNITED STATES PATENTS

| Number | Name | Date |
| --- | --- | --- |
| 2,299,604 | Weirich | Oct. 20, 1942 |

OTHER REFERENCES

Berichte, 33, 1559 (1900).
Berichte, 66, 364–372 (1933).
Whitmore: Organic Chemistry, D. Van Nostrand Co., New York, N. Y. (1937), page 893.
King et al.: J. Chem. Soc., 1939 (873–877).